United States Patent [19]

Motsch

[11] Patent Number: 5,762,299
[45] Date of Patent: Jun. 9, 1998

[54] CLIP FOR RETAINING TUBES

[75] Inventor: Uwe Motsch, Rheinfelden, Germany

[73] Assignee: A. Raymond & Cie, Grenoble, France

[21] Appl. No.: 723,934

[22] Filed: Sep. 30, 1996

[30] Foreign Application Priority Data

Sep. 29, 1995 [DE] Germany ............. 195 36 316.7

[51] Int. Cl.⁶ .................... F16L 3/12; F16L 3/08
[52] U.S. Cl. ............. 248/71; 248/74.2; 248/74.1; 248/73; 248/65
[58] Field of Search .................. 248/71, 73, 74.1, 248/74.2, 300, 316.7, 65

[56] References Cited

U.S. PATENT DOCUMENTS

| | | | |
|---|---|---|---|
| 2,618,033 | 11/1952 | Tinnerman et al. | 248/71 |
| 3,012,745 | 12/1961 | Donovan | 248/71 |
| 3,024,509 | 3/1962 | Hamann | 248/71 |
| 3,107,076 | 10/1963 | Rosselet | 248/71 |
| 3,216,685 | 11/1965 | Raymond | 248/74.2 |
| 3,262,662 | 7/1966 | Gastaldi | 248/74.2 |

Primary Examiner—Leslie A. Braun
Assistant Examiner—Kimberly T. Wood
Attorney, Agent, or Firm—Finnegan, Henderson, Farabow, Garrett & Dunner

[57] ABSTRACT

A clip for the retention of tubes, especially corrugated tubes, consisting of a clamping strap (2) for receiving the tube (7), said clamping strap being connected in a C-shape manner to a baseplate (1) and being capable of springing open elastically, and of anchors (8), formed on the baseplate (1), for anchoring the clip in a hole of a carrier body, wherein the anchors (8) are formed from two profile bars (9) and (10) which rest flat against one another and which are connected to one another at their lower end by a web (11) and have claws (15) at their side edges (14), one profile bar (9) being provided with a bearing plate (16) which is formed on at right angles and which is connected at its free end, via deformable webs (17), to the free end of the baseplate (1) at an acute angle (α), and the other profile bar (10) being designed, in rectilinear prolongation, as a lever (18) which rests flush against the rear wall (5) of the oblique clamping strap (2).

7 Claims, 1 Drawing Sheet

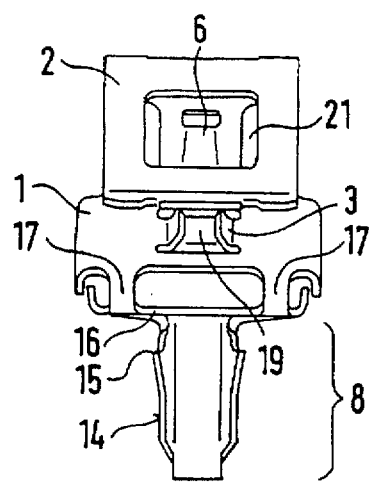
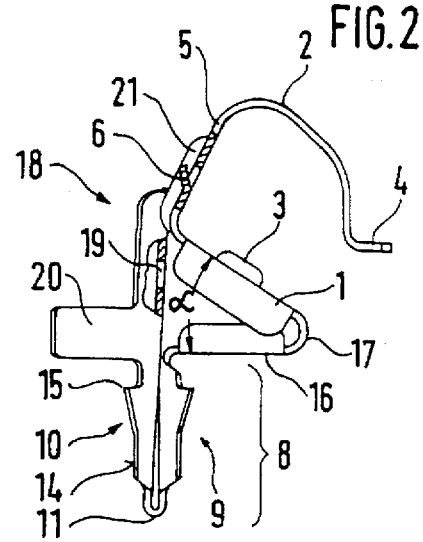
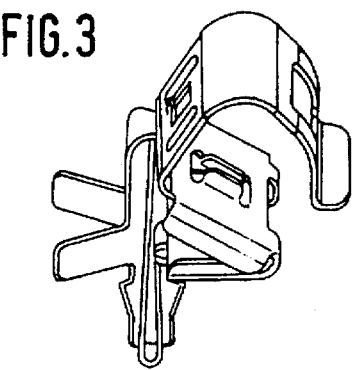
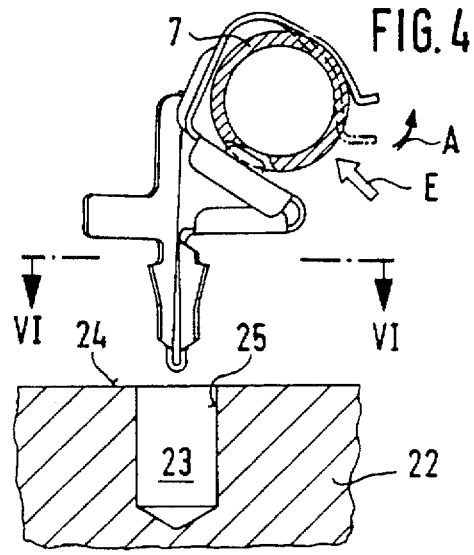
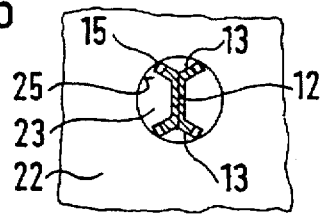
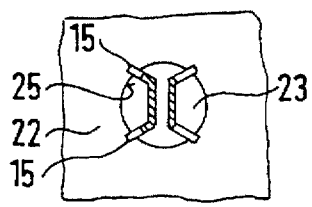
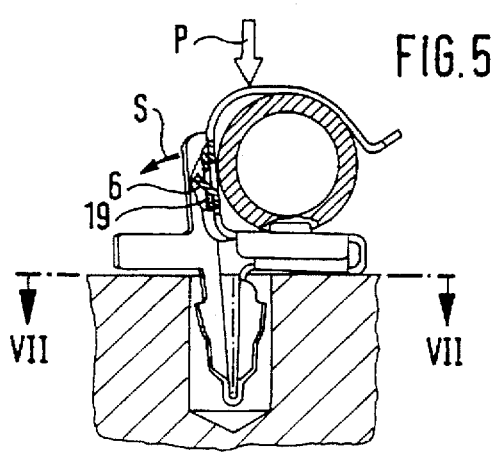

1

CLIP FOR RETAINING TUBES

BACKGROUND OF THE INVENTION

This invention relates to a clip for retaining tubes, especially corrugated tubes, consisting of a clamping strap for receiving the tube, the clamping strap being connected in a C-shape manner to a baseplate and being capable of springing open elastically, and of means, formed on the baseplate, for anchoring the clip in a hole of a carrier body.

A clip of this type for anchoring in a hole of a carrier plate is known, for example, from U.S. Pat. No. 2,166,916. In this case, the clip is designed in such a way that two obliquely converging side walls, which form at the upper ends thereof an orifice for introducing the tube, are provided on the baseplate. Two likewise obliquely converging clamping straps directed towards the baseplate are formed on these walls so as to be capable of springing open, the clamping straps projecting through a clearance in the baseplate and being provided with hooks pointing outwardly approximately at right angles. During assembly, these hooks are introduced into the hole of the carrier plate and are then pressed apart from one another laterally by the tube when the tube is pressed into the orifice, the hooks engaging behind the hole's edge and thereby being anchored firmly in place.

Admittedly, the advantage of this anchoring principle is that anchoring in the hole is carried out solely by pressing the tube into the clip. However, at the same time, it has the disadvantage that the clip remains firmly anchored only as long as the tube is held by the clamping straps. Whenever the tube is removed, the clamping straps spring together again, and the hooks can easily come loose from their anchoring.

An object of the present invention is, therefore, to provide a holding clip for tubes, which clip, on the one hand, can easily be anchored after the introduction of the tube, but, on the other hand, remains anchored in place whenever the tube has to be removed.

SUMMARY OF THE INVENTION

This object is achieved in accordance with the present invention by providing a clip for retaining tubes, especially corrugated tubes, consisting of a clamping strap for receiving the tube, said clamping strap being connected in a C-shape manner to a baseplate and being capable of springing open elastically, and of means formed on the baseplate, for anchoring the clip in a hole of a carrier body, wherein the anchoring means are formed from two profile bars and which rest flat against one another and which are connected to one another at their lower end by means of a web and have claws at their side edges, one profile bar being provided with a bearing plate which is formed on at right angles and which is connected at its free end, via deformable webs, to the free end of the baseplate at an acute angle ($\alpha$), and the other profile bar being designed, in rectilinear prolongation, as a lever which rests flush against the rear wall of the oblique clamping strap.

Pressing down the clamping strap for anchoring purposes can be carried out both with the tube inserted in the clamping strap and with the clamping strap empty.

BRIEF DESCRIPTION OF THE DRAWINGS

An exemplary embodiment of the invention is illustrated in the drawings and is to be discussed in more detail below. In the drawings.

FIG. 1 is a front view of the tube clip,

FIG. 2 is a side view of the tube clip,

FIG. 3 is a perspective view of the tube clip,

FIG. 4 shows the clip with an inserted tube, before anchoring in a blind hole,

FIG. 5 shows the clip with an inserted tube, after anchoring in the blind hole,

FIG. 6 is a sectional view through the profile bars resting flat against one another, taken along the line VI—VI in FIG. 4, and FIG. 7 is a sectional view through spread profile bars taken along the line VII—VII in FIG. 5.

DETAILED DESCRIPTION OF THE INVENTION

The holding clip illustrated in the figures is produced from a single strip of spring steel and serves for the retention of tubes, especially corrugated tubes, on carrier bodies composed of solid and relatively firm material, such as hard cast iron, plastic, hard wood, and the like.

The clip includes a baseplate 1 and a clamping strap 2 for receiving a corrugated tube 7, the clamping strap being connected to the baseplate to form a C-shaped structure. To retain a tube 7 in clamping strap 2 in the axial direction, two tabs 3 directed towards one another in the axial direction of the tube are cut out from baseplate 1 and bent up towards clamping strap 2. See FIG. 1. After a corrugated tube 7 has been pressed into the clip, these tabs 3 penetrate into the grooves of the latter and thus serve as a safeguard against axial displacement.

Clamping strap 2 is adapted to the diameter of the tube 7 to be held, in such a way that, as is evident from FIG. 4, the tube 7, when being pressed in the direction of the arrow "E", is clamped, with the clamping strap 2 widening elastically in the direction of the arrow "A". So that tube 7 can be pressed in easily, the clamping strap 2 possesses a bent-up introduction tab 4 at its free end.

The baseplate is connected in a way yet to be described to an anchoring means 8 which serves for anchoring the tube clip in a blind hole 23 of a carrier body 22. As embodied, the anchoring means 8 comprises two profile bars 9 and 10 which rest flat against one another and which are connected to one another at their lower end by means of a web 11. As is evident from FIGS. 6 and 7, these profile bars 9 and 10 consist in each case of a flat middle wall portion 12 and of two side wall portions 13 that extend obliquely outwardly from the two longitudinal sides of the middle wall portion. At the outer side edges 14 of the side walls 13, which are directed away from one another, are claws 15, the tips of which are adapted to fit within the hole wall 25 of the blind hole 23 as long as the middle walls 12 of the profile bars 9 and 10 abut or touch one another.

A bearing or support plate 16 extends at a right angle from one of the two profile bars, as shown from bar 9, that bears against or rests on the surface 24 of the carrier body 22 when the clip is anchored in the hole 23. Support plate 16 is connected at its free edge, via deformable webs 17, to the opposite end of baseplate 1 from the end to which clamping strap 2 is connected, baseplate 1 projecting obliquely upwardly from the support plate at an acute angle "$\alpha$", which is preferably between 30° and 45°.

The other profile bar 10 is connected in a flexurally rigid manner, and in rectilinear prolongation thereof, to a lever arm 18 which rests flush against an obliquely disposed rear wall 5 of the clamping strap 2.

In the design according to the invention of anchoring means 8 and the oblique position of baseplate 1 and of clamping strap 2, the baseplate being connected to the support plate 16, ensures that, after the introduction of the profile bars 9 and 10 into a blind hole, when baseplate 1 is pressed down onto support plate 16, lever arm 18 will be pressed back away from rear wall 5 of the clamping strap 2 and profile bar 10 connected to it in a flexually rigid manner is thereby pushed away from profile bar 9 resting against said profile bar 10, and in such a way that the laterally projecting claws 15 are pressed firmly against wall 25 of the blind hole 23 and, as is evident from FIG. 7, at the same time dig into the wall 25. The shape of the profile bars allows anchoring both in the hole of a carrier plate and in the blind hole of a solid carrier body, such as, for example, an engine block.

To fix the tube clip securely in the anchored position (FIG. 5), a closing hook 6 is provided on rear wall 5 of clamping strap 2 that is bent away obliquely upward in the direction of lever arm 18, whilst a corresponding opening 19 is provided on the extension of middle wall 12 of lever arm 18.

When the clamping strap 2 together with the inserted tube 7 is pressed in the direction of the arrow "P"(FIG. 5), the lever arm 18 shifts sideways in the direction of the arrow "S" by the closing hook 6 moving downward against middle wall 12, until the baseplate 1 rests on the support plate 16. At this moment, closing hook 6 engages with or into the opening 19 in the wall 12 and is locked. Thus an unintentional release of the tube clip is absolutely impossible. This ensures, furthermore, that the tube clip remains anchored in the blind hole 23 even if corrugated tube 7 is later pulled out of clamping strap 2.

To stiffen rear wall 5 of clamping strap 2, stiffening webs or beads 21 are provided on rear wall 5 of clamping strap 2 on both sides of closing hook 6, the beads being arched forward in the direction of lever arm 18 close to the side walls 13 of the later. This not only stiffens the rear wall of the clamping strap, but advantageously results in additional lateral guidance when clamping strap 2 and baseplate 1 are pressed down onto support plate 16. In addition, supporting tabs 20 are provided that project laterally outwardly from a middle portion of the outer edges of the side walls 13 of lever arm 18 level with support plate 16, so that the clip can rest firmly against the surface 24 of carrier plate 22 as shown in FIG. 5.

I claim:

1. A clip for retaining tubes comprising a clamping strap, a baseplate having a side connected to one end of the clamping strap to form a C-shaped structure, said clamping strap being capable of springing open elastically with respect to said baseplate for receiving and holding an elongated tube between said strap and baseplate, and anchoring means connected to the baseplate for anchoring the clip in a hole in a carrier body, said anchoring means comprising a pair of profile bars, a portion of each of which rests flat against each other, said bars in such position being adapted to fit in and extend longitudinally of the hole, said bars being connected to one another at a lower end of each by a web and having laterally projecting claws on side edges thereof, a first one of said profile bars being connected at an upper end thereof to a support plate that extends outwardly at right angles from the bar and is connected at a free end thereof to a side of the baseplate opposite from the side connected to the clamping strap by at least one deformable web, said baseplate projecting obliquely upwardly from the support plate at an acute angle a and the second of said profile bars having a lever arm that extends upwardly in rectilinear prolongation thereof above the upper end of the first profile bar to a point where it rests flush against a rear wall of the clamping strap, whereby upon pressing down of the baseplate onto the support plate with bending of the deformable web, the rear wall of the clamping strap will push the lever arm outwardly and the profile bars away from each other, to cause the laterally projecting claws on the profile bars to engage the side walls of the hole and anchor the clip in place.

2. The clip of claim 1, wherein each profile bar has a middle wall portion that rests flat against each other and two side wall portions that extend obliquely outwardly from the longitudinal sides of the middle wall portion the laterally projecting claws being provided on outer side edges of the side wall portions of the profile bars.

3. The clip of claim 1, wherein the rear wall of the clamping strap has a closing hook adapted to engage with an opening in the lever arm after the baseplate has been pressed down onto the support plate to lock the baseplate and connected clamping strap in the pressed down position.

4. The clip of claim 3, including a pair of spaced stiffening beads extending outwardly from the rear wall of the clamping strap and on either side of the closing hook, said beads being located on either longitudinal side of the lever arm when the baseplate is pressed down onto the support plate.

5. The clip of claim 1, including laterally projecting supporting tabs extending outwardly from opposite longitudinal sides of the lever arm at the level of and generally in an opposite direction from the support plate.

6. The clip of claim 1, including at least one tab on the baseplate engageable with the tube to prevent axial movement of the tube in the clip.

7. The clip of claim 1, formed from a single piece of sheet steel.

* * * * *